(12) United States Patent
Song

(10) Patent No.: US 7,916,258 B2
(45) Date of Patent: Mar. 29, 2011

(54) IN-PLANE SWITCHING LCD PANEL

(75) Inventor: In-Duk Song, Kumi-shi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 09/737,770

(22) Filed: Dec. 18, 2000

(65) Prior Publication Data

US 2001/0013915 A1    Aug. 16, 2001

(30) Foreign Application Priority Data

Dec. 16, 1999   (KR) .................................. 1999-58108

(51) Int. Cl.
*G02F 1/1343*    (2006.01)
(52) U.S. Cl. ........................................................ 349/141
(58) Field of Classification Search .................... 349/141
See application file for complete search history.

(56) References Cited

U.S. PATENT DOCUMENTS

| | | | | |
|---|---|---|---|---|
| 6,049,365 A * | 4/2000 | Nakashima | ...................... | 349/42 |
| 6,094,250 A * | 7/2000 | Choi et al. | ...................... | 349/141 |
| 6,219,125 B1 * | 4/2001 | Ishikura et al. | ............... | 349/147 |
| 6,278,502 B1 * | 8/2001 | Colgan et al. | ................... | 349/38 |
| 6,300,995 B1 * | 10/2001 | Wakagi et al. | ................. | 349/141 |
| 6,323,918 B1 * | 11/2001 | Yoshioka et al. | ................ | 349/48 |
| 6,356,328 B1 * | 3/2002 | Shin et al. | ...................... | 349/141 |
| 6,356,330 B1 * | 3/2002 | Ando et al. | ..................... | 349/141 |
| 6,362,858 B1 * | 3/2002 | Jeon et al. | ........................ | 349/43 |
| 7,724,336 B2 * | 5/2010 | Kim et al. | ...................... | 349/141 |
| 7,733,453 B2 * | 6/2010 | Ahn | .............................. | 349/141 |
| 7,760,276 B2 * | 7/2010 | Ahn et al. | ....................... | 349/39 |
| 2002/0008824 A1 * | 1/2002 | Son et al. | ....................... | 349/141 |

FOREIGN PATENT DOCUMENTS

KR   1999-0042086   6/1999
KR   1999-0068095   8/1999

OTHER PUBLICATIONS

Notification from Korean Patent Office dated Nov. 23, 2004

* cited by examiner

*Primary Examiner* — Timothy Rude
(74) *Attorney, Agent, or Firm* — McKenna Long & Aldridge LLP

(57) ABSTRACT

An IPS-LCD panel includes first and second substrates, and a liquid crystal interposed therebetween. The first substrate includes common and pixel electrodes that are formed of a transparent conductive material. Because the common and pixel electrodes are transparent, aperture ratios of the inventive IPS-LCD panel are increased. Another IPS-LCD panel includes opaque pixel electrodes and transparent common electrodes. In forming the opaque pixel electrodes, a black matrix of the same material as the pixel electrodes is also formed on the first substrate. Because the inventive black matrix is much smaller than a conventional one, the aperture ratios of the second inventive IPS-LCD panel become higher.

24 Claims, 11 Drawing Sheets

IN-PLANE SWITCHING LCD PANEL

This application claims the benefit of Korean Patent Application No. 1999-58108, filed on Dec. 16, 1999, which is hereby incorporated by reference.

BACKGROUND OF THE INVENTION

1. Field of the Invention

The present invention relates to a liquid crystal display device, and more particularly to a liquid crystal display device implementing in-plane switching (IPS) where an electric field to be applied to liquid crystal is generated in a plane parallel to a substrate.

2. Discussion of the Related Art

Recently, liquid crystal display (LCD) devices with light, thin, and low power consumption characteristics are used in office automation equipment and video units and the like. Driving methods for such LCDs typically include a twisted nematic (TN) mode and a super twisted nematic (STN) mode. Although TN-LCDs and STN-LCDs have been put to practical use, they have a drawback in that they have a very narrow viewing angle. In order to solve the problem of narrow viewing angle, IPS-LCD devices have been proposed. IPS-LCD devices typically include a lower substrate where a pixel electrode and a common electrode are disposed, an upper substrate having no electrode, and a liquid crystal interposed between the upper and lower substrates.

FIG. 1 is a cross-sectional view illustrating a conventional TN-LCD panel. As shown in FIG. 1, the liquid crystal display panel has lower and upper substrates 1a and 1b with a liquid crystal layer ("LC") interposed between the lower and upper substrates 1a and 1b. The lower substrate 1a has a thin film transistor ("TFT") as a switching element for changing orientation of the LC molecules. The TFT includes a pixel electrode 15 to apply a voltage to the LC layer according to signals from the TFT. The upper substrate 1b has a color filter 25 for implementing colors. There is a common electrode 14 on the color filter 25. The common electrode 14 serves as an electrode for applying a voltage to the LC layer. The pixel electrode 15 is arranged over a pixel portion "P", i.e., a display area. Further, to prevent leakage of the liquid crystal injected into the space between the two substrates 1a and 1b, the two substrates 1a and 1b are sealed by a sealant 6.

As described above, because the pixel and common electrodes 15 and 14 of the conventional TN-LCD panel are positioned on the lower and upper substrates 1a and 1b, respectively, the electric field induced therebetween is perpendicular to the lower and upper substrates 1a and 1b. Therefore, unlike the TN or STN-LCD panel, the IPS-LCD panel implements an electric field parallel to the substrates. A detailed explanation about operation modes of a typical IPS-LCD panel will be provided referring to FIGS. 2 to 6.

As shown in FIG. 2, lower and upper substrates 1a and 1b are spaced apart from each other, and a liquid crystal is interposed therebetween. The lower and upper substrates are called array and color filter substrates, respectively. Pixel and common electrodes 15 and 14 are disposed on the lower substrate 1a. The pixel and common electrodes 15 and 14 are parallel with and spaced apart from each other. A color filter 25 is disposed on a surface of the upper substrate 1b and opposes the lower substrate 1a. The pixel and common electrodes 15 and 14 apply an electric field "E" to the liquid crystal. The liquid crystal has a negative dielectric anisotropy, and thus it is aligned parallel with the electric field "E".

FIGS. 3 to 6 conceptually illustrate operation modes of a conventional IPS-LCD device. When there is no electric field between the pixel and the common electrodes 15 and 14, the long axes of the liquid crystal molecules maintain an angle from a line perpendicular to the parallel pixel and common electrodes 15 and 14. Herein, the angle is 45 degrees, for example.

On the contrary, when there is an electric field between the pixel and common electrodes 15 and 14, there is an in-plane electric field "E" parallel to the surface of the lower substrate 1a between the pixel and common electrodes 15 and 14. The in-plane electric field "E" is parallel to the surface of the lower substrate 1a because the pixel and common electrodes are formed on the lower substrate 1a. Accordingly, the liquid crystal molecules are twisted so as to align the long axes thereof with the direction of the electric field, thereby the liquid crystal molecules are aligned such that the long axes thereof are parallel with the line perpendicular to the pixel and common electrodes 15 and 14.

By the above-mentioned operation modes and with additional parts such as polarizers and alignment layers, the IPS-LCD device displays images. The IPS-LCD device has wide viewing angle and low color dispersion. The fabricating processes of this IPS-LCD device are simpler that other various LCD devices. But, because the pixel and common electrodes are disposed on the same plane of the lower substrate, the transmittance and aperture ratio are low.

For the sake of discussing the above-mentioned problem of the IPS-LCD device in detail, with reference to FIGS. 7A and 7B, the basic structure of the IPS-LCD device will be described in detail.

FIG. 7A is a plan view illustrating in detail the structure of one pixel region in the IPS-LCD device, specifically, a unit pixel region 10. In addition, a cross-sectional view taken along a line "B-B" in FIG. 7A is illustrated in FIG. 7B.

On the surface of the transparent substrate 1A adjacent to the liquid crystal layer, a scan signal line 2 made of, for example, aluminum (Al) is formed extending along the x-direction, as shown in FIG. 7A. In addition, a reference signal line 4, also known as a common line, is formed extending along the x-direction, close to the scan signal line 2 on the +y-direction side thereof. The reference signal line 4 is also made of, for example, Al. A region surrounded by the scan signal line 2, the reference signal line 4, and the video signal lines 3 constitutes a pixel region 10, as previously described.

In addition, the pixel region 10 includes a reference electrode 14 formed by the reference signal line 4, and another reference electrode 14 formed adjacent to the scan signal line 2. The pair of horizontally extending reference electrodes 14 are positioned adjacent to one of a pair of video signal line 3 (on the right side of the figure), and are electrically connected to each other through a conductive layer 14A which is formed simultaneously with the reference electrodes 14.

In the structure described above, the reference electrodes 14 form a pair extending in the direction parallel to the scan signal line 2. Stated another way, the reference electrodes form a strip extending in a direction perpendicular to the video signal lines 3, later described.

A first insulating film 11 (see FIG. 7B) made of, for example, silicon nitride is formed on the surface of the lower substrate 1A on which the scan signal lines 2 are formed, overlying the scan signal line 2, the reference signal lines 4, and the reference electrodes 14. The first insulating film 11 functions as (i) an inter-layer insulating film for insulating the scan signal line 2 and the reference signal line 4 from the video signal lines 3, (ii) as a gate-insulating layer for a region in which a thin film transistor (TFT) is formed, and (iii) as a dielectric film for a region in which a capacitor Cstg is formed. The TFT includes a drain electrode 3A and a source electrode 15A. A semiconductor layer 12 for the TFT is formed near a cross point of the gate and data lines 2 and 3. A first polarization layer 18 is formed on the other surface of the lower substrate 1A.

On the first insulating film 11, a display electrode 15 is formed parallel with the reference electrode 14. One end portion of the display electrode 15 is electrically connected with the conductive layer 14A, and the other end portion thereof is electrically connected with the source electrode 15A. Still on the first insulating film 11, a first planar film 16 is formed to cover the display electrode 15. A first alignment film 17 is formed on the first planar film 16.

FIG. 7B illustrates a cross-sectional view of the upper substrate 1B on which a black matrix 300 is formed. A color filter 25 is formed to close an opening in the black matrix 300. Then, a second planar film 27 is formed to cover the color filter 25 and the black matrix 300. A second alignment layer 28 is formed on the surface of the second planar film 27 facing the liquid crystal layer.

The color filter 25 is formed to define three sub-pixel regions adjacent to and extending along the video signal line 3 and to position a red (R) filter, a green (G) filter, and a blue (B) filter, for example, from the top of the three sub-pixel regions. The three sub-pixel regions constitute one pixel region for color display.

A second polarization layer 29 is also arranged on the surface of the upper substrate 1B that is opposite to the surface of the upper substrate 1B adjacent to the liquid crystal layer, on which various films are formed as described above.

It will be understood that in FIG. 7B, a voltage applied between the reference electrodes 14 and the display electrode 15 causes an electric field E to be generated in the liquid crystal layer LC in parallel with the respective surfaces of the lower and upper substrates 1A, 1B. This is why the illustrated structure is referred to as the in plane switching, as mentioned above.

To improve the aperture ratio, the distance between the reference and display electrodes 14 and 15 should be enlarged. In that case, a driving voltage to induce the electric field between the reference and display electrodes 14 and 15 must be increased to maintain a normal display.

Further, since the low aperture ratio results in a low brightness quality of the liquid crystal display device, the incident light from the back-light device must be brighter to compensate, which increases power consumption of the liquid crystal display device.

FIG. 8 shows an array substrate of another conventional IPS-LCD device.

As shown in FIG. 8, gate and common lines 50 and 54 are arranged transversely and parallel with each other. A data line 60 is arranged perpendicular to the gate and common lines 50 and 54. Gate electrode 52 and source electrode 62 are positioned near a cross point of the gate and data lines 50 and 60, and communicate with the gate line 50 and the data line 60, respectively. Herein, the source electrode 62 overlaps a portion of the gate electrode 52.

A plurality of common electrodes 54a are positioned spaced apart and perpendicular to the common line 54. The common electrodes 54a communicate with the common line 54. A first connecting line 66 communicates with the drain electrode 64, and a plurality of pixel electrodes 66a are positioned perpendicular to the first connecting line 66. First ends of the pixel electrodes 66a communicate with the first connecting line 66, and the second ends of pixel electrodes 66a communicate with a second connecting line 68 that is positioned over the common line 54. Accordingly, the common electrodes 54a and the pixel electrodes 66a are parallel with and spaced apart from each other in an alternating pattern.

Similarly to the array substrate of FIG. 7A, since the pixel and common electrodes 66a and 54a are formed on the same substrate, the aperture ratio is reduced. That is to say, the opaque pixel and common electrodes prevent incident light produced by a back light (not shown) from passing through pixel areas covered by the pixel and common electrodes. If distances between the common and pixel electrodes are enlarged to improve the aperture ratios, much stronger driving voltage must be generated between the electrodes to compensate for the loss of the electric fields due to the greater distance therebetween.

In addition, the intensity of the back light must be increased to compensate for the loss of the back light due to the decrease in the aperture ratios. Therefore, power consumption will be increased.

SUMMARY OF THE INVENTION

Accordingly, the present invention is directed to an IPS-LCD device that substantially obviates one or more of the problems due to limitations and disadvantages of the related art.

An object of the present invention is to provide an IPS-LCD device having a high aperture ratio.

In order to achieve the above object, the first preferred embodiment of the present invention provides an in-plane switching liquid crystal display device including a gate line on a first substrate; a data line on the first substrate, the data line being perpendicular to the gate line; a common line on the first substrate, the common line being parallel with the gate line and being formed of a metal; a pixel electrode and a common electrode on the first substrate, the pixel and common electrodes being formed of a transparent conductive material; and a liquid crystal layer between the first and second substrates.

The transparent conductive material includes indium tin oxide (ITO) or indium zinc oxide (IZO).

The device further includes an auxiliary common line on the first substrate, the auxiliary common line being connected with the common electrode. The auxiliary common line includes indium tin oxide (ITO) or indium zinc oxide (IZO).

The gate and common lines include a material selected from a group consisting of chromium (Cr), aluminum (Al), aluminum alloy (Al alloy), molybdenum (Mo), tantalum (Ta), tungsten (W), antimony (Sb), and an alloy thereof.

The device further includes a first alignment layer on the first substrate.

The first alignment layer is selected from a group consisting of polyimide and photo-alignment material.

The device further includes a thin film transistor at an intersection of the gate and data lines.

At least one of the pixel and common electrodes is on the same layer with the gate electrode.

The device further includes a gate-insulating layer over the pixel electrode.

The device further includes a passivation layer over the gate-insulating layer.

The common electrode is on the passivation layer.

The device further includes a black matrix on the passivation layer.

The black matrix includes the same material as the pixel electrodes.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

First Preferred Embodiment

Figure 1:
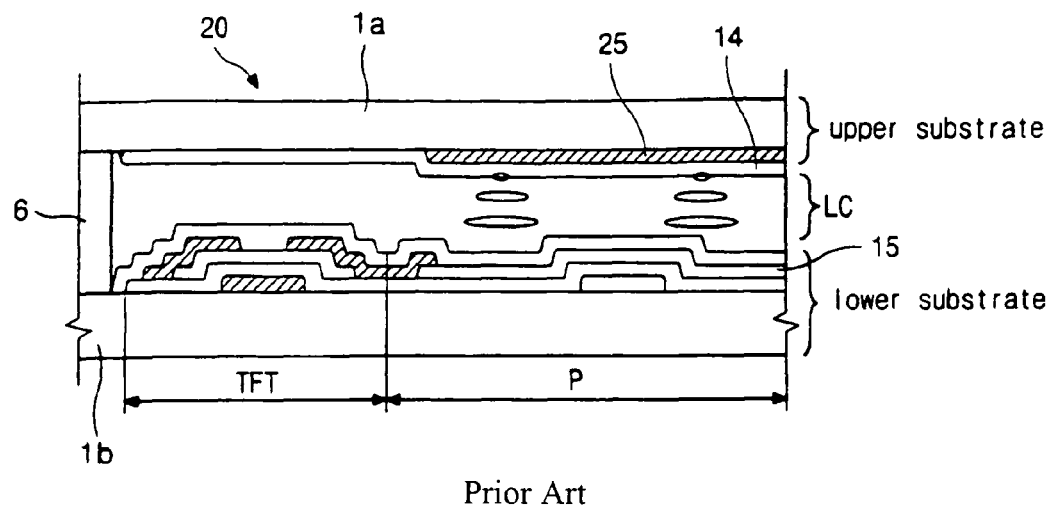
FIG. 1 is a cross-sectional view illustrating a liquid crystal display device according to the related art.
Figure 2:
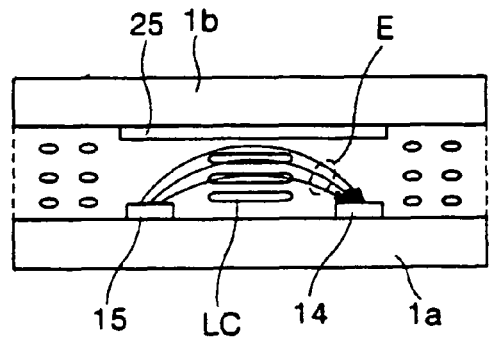
FIGS. 2 to 6 are perspective views illustrating operation modes of the conventional IPS-LCD device.
Figure 3:
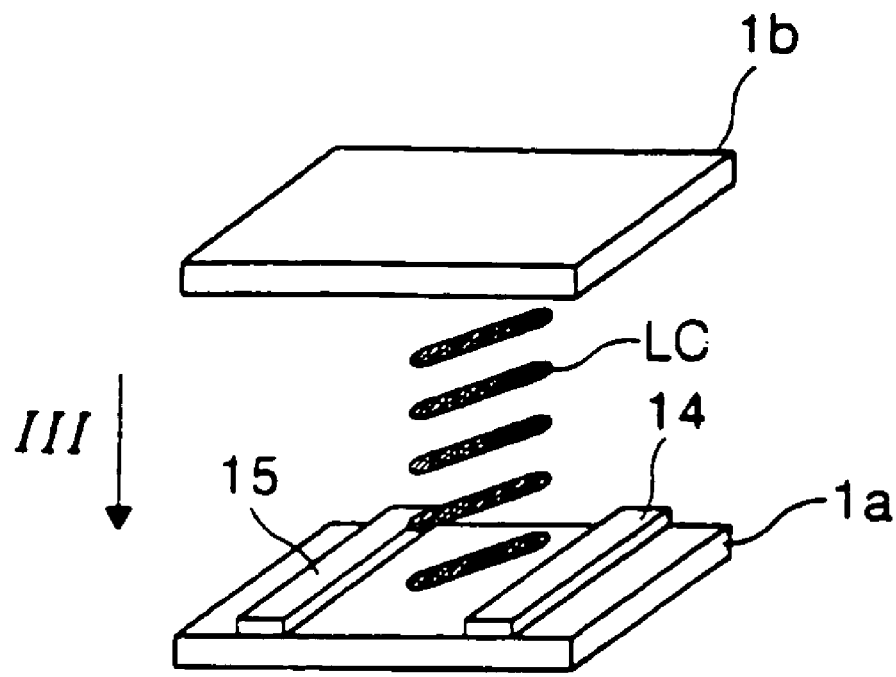
Figure 4:
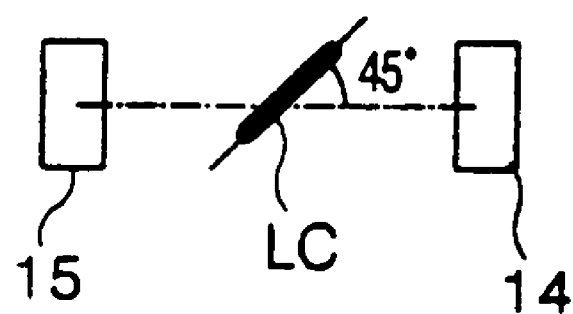
Figure 5:
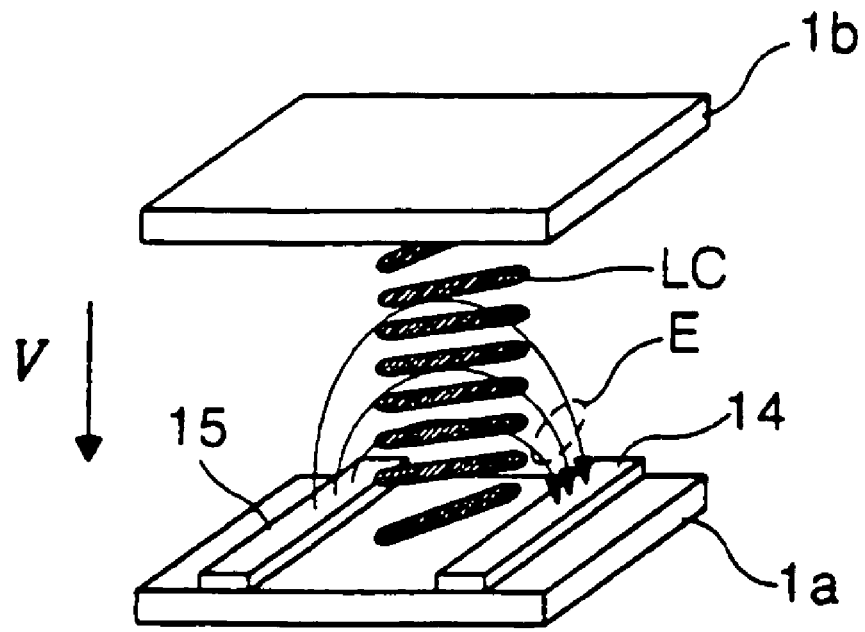
Figure 6:
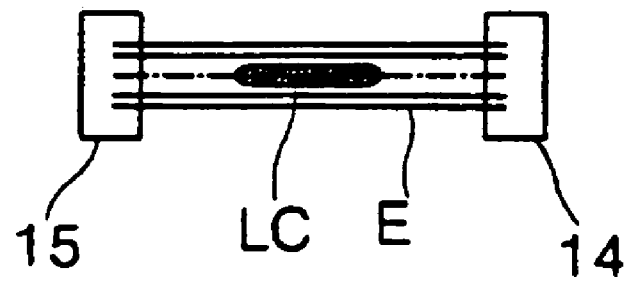
Figure 7A:
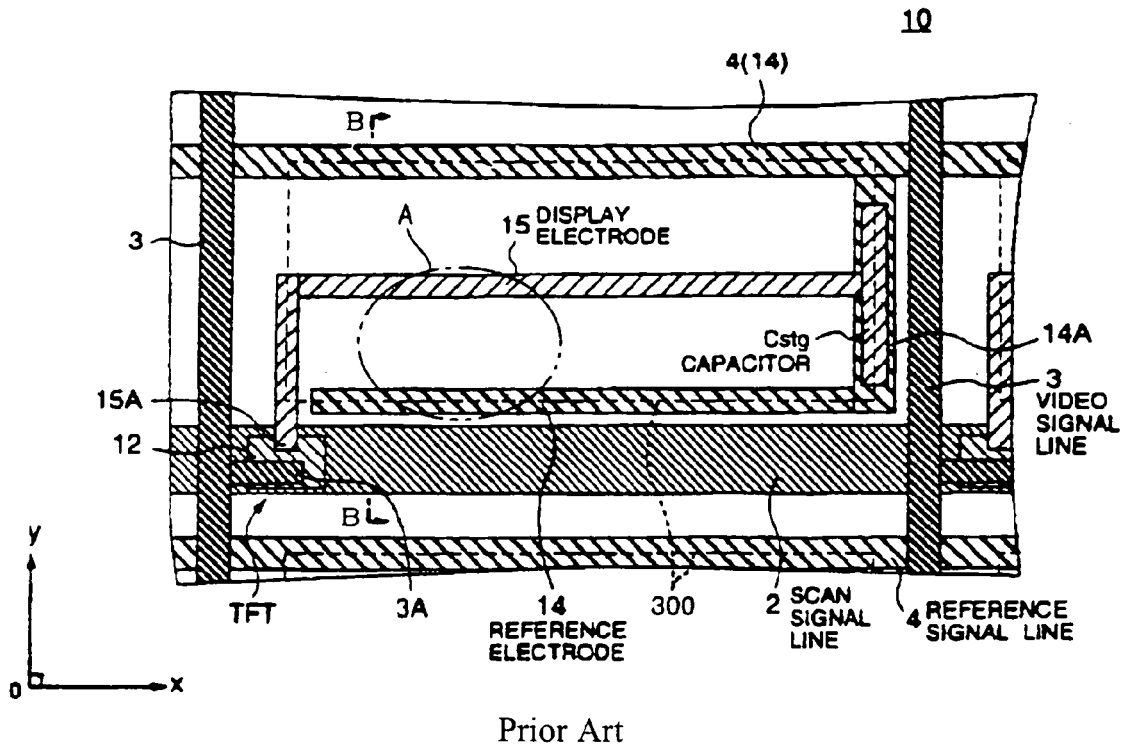
FIG. 7A is a plane view illustrating an array substrate of the conventional IPS-LCD device.
Figure 7B:
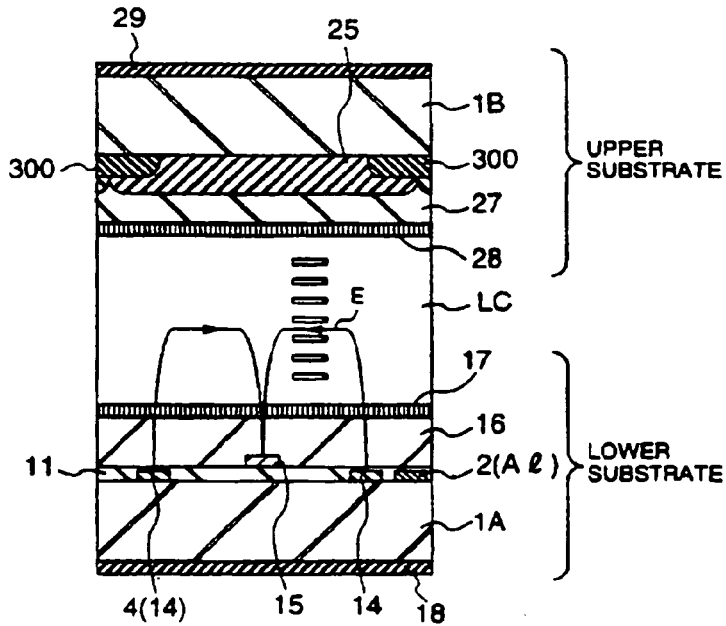
FIG. 7B is a cross-sectional view taken along a line "B-B" in FIG. 7A.
Figure 8:
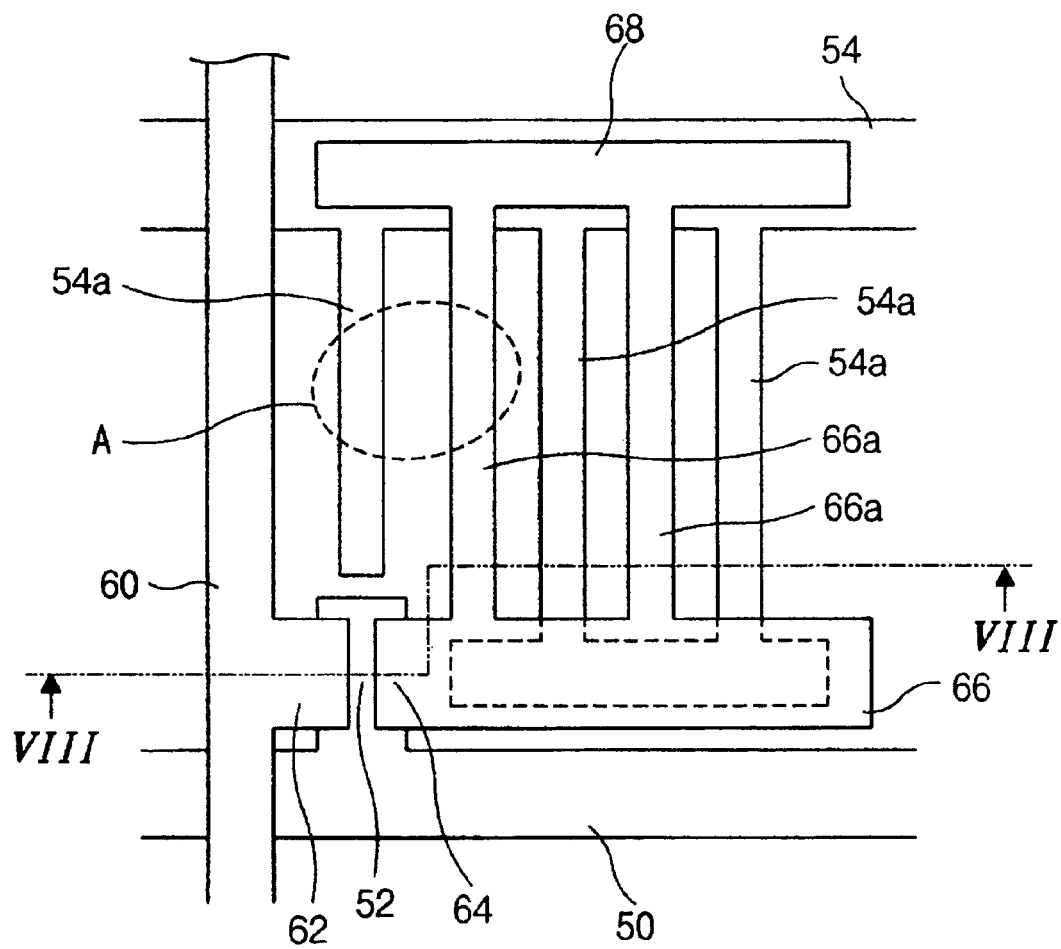
FIG. 8 is a plane view of an array substrate of another conventional IPS-LCD device.
Figure 9:
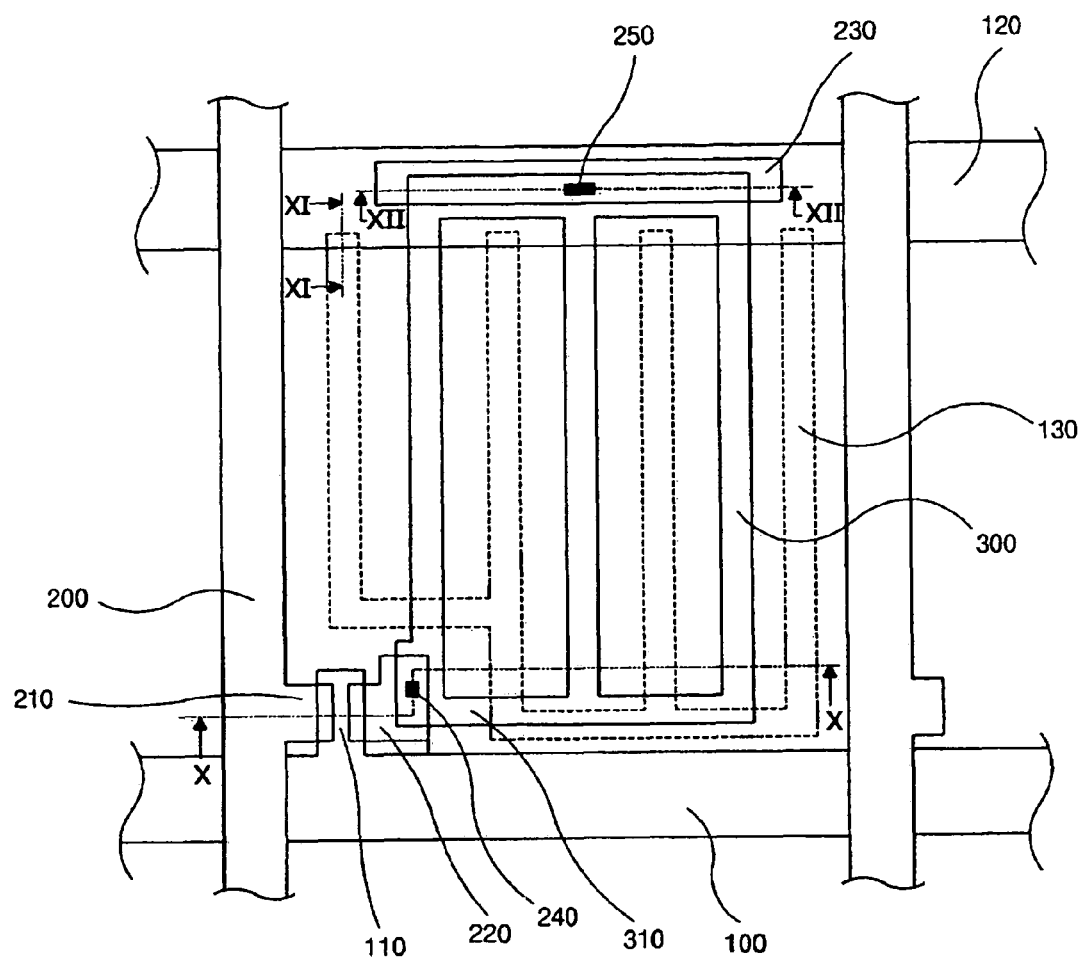
FIG. 9 is a plane view illustrating an array substrate of an IPS-LCD device according a first preferred embodiment of the present invention.

FIG. 9 is a plane view of an array substrate according to a first preferred embodiment of the present invention.

Figure 10A:
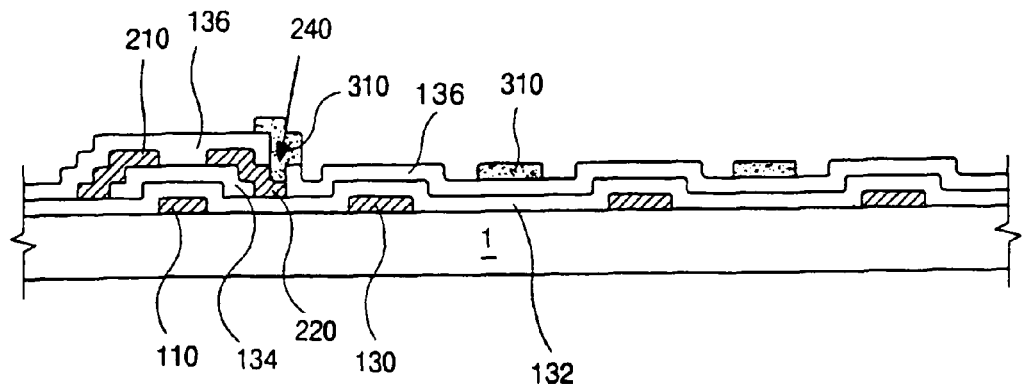
FIGS. 10A and 10B are different cross-sectional views for different embodiments of the present invention taken along a line "X-X" of FIG. 9.

As shown in FIG. 9 and FIG. 10A, a gate line 100 is transversely disposed on a substrate 1. A common line 120 is spaced apart from the gate line 100 and disposed parallel with the gate line 100. A data line 200 that is spaced apart from each other is disposed across and perpendicular to the gate and the common lines 100 and 120.

Near an intersection of the gate and data lines 100 and 200, gate and source electrodes 110 and 210 are positioned and electrically connected with the gate and data lines 100 and 200, respectively. A drain electrode 220, including a drain contact hole 240, is spaced apart from the source electrode 210 and overlaps a portion of the gate electrode 110. The source electrode 210 also overlaps a portion of the gate electrode 110.

A first connecting line 320 electrically contacts the drain electrode 220 through the drain contact hole 240, and is disposed parallel with the gate line 100. A plurality of pixel electrodes 310 are disposed perpendicular to the first connecting line 320, and communicate with the first connecting line 320. Ends of the pixel electrodes 310 are connected with a second connecting line 330 over the common electrode 130.

A storage electrode 230 including a storage contact hole 250 is disposed over the common line 120, and electrically contacts the second connecting line 330 through the storage contact hole 250. Namely, each of the pixel electrodes 310 is electrically connected with the storage electrode 230.

A plurality of common electrodes 130 are disposed parallel with the pixel electrodes 310, and electrically contact the common line 120. Each common electrode 130 is spaced apart from the adjacent pixel electrodes 310. One end of each of the common electrodes is electrically connected to one another.

The common line 120 and the gate and data lines 100 and 200 are an opaque metal, while the common and pixel electrodes 130 and 310 are a transparent conductive material. Preferably, the opaque metal is selected from a group consisting of chromium (Cr), aluminum (Al), aluminum alloy (Al alloy), molybdenum (Mo), tantalum (Ta), tungsten (W), and antimony (Sb), and an alloy thereof, while the transparent conductive material is indium tin oxide (ITO) or indium zinc oxide (IZO).

Now, referring to FIG. 10A, a fabricating process for the array substrate 1 shown in FIG. 9 is provided.

At first, the gate and common electrodes 110 and 130 are formed on the substrate 1. The gate line 100 of FIG. 9 is formed with the gate electrode 110 in the same layer. Because the gate and common electrodes 110 and 130 are different materials, they are formed in different steps. After that, a gate-insulating layer 132 is formed on the substrate 1 to cover the gate and common electrodes 110 and 130. Subsequently, an active layer 134 is formed on the gate-insulating layer 132, particularly over the gate electrode 110. The gate-insulating layer 132 is silicon nitride (SiNx) or silicon oxide (SiO$_2$), while the active layer 134 includes an amorphous silicon layer (a-Si) and a doped amorphous silicon layer (n$^+$a-Si, not shown).

The source and drain electrodes 210 and 220 are formed on the active layer 134, and are made of the same material as the gate electrode 110. Further, the source and drain electrodes 210 and 220 and the gate electrode 110 may be formed of different materials. At this point, the data lines 200 of FIG. 9 are formed together with the source electrode 210 such that the data lines 200 and the source electrode 210 are connected. Thereafter, a passivation layer 136 is deposited over the substrate 1 and patterned to form the drain contact hole 240 that exposes a portion of the drain electrode 220.

Next, the pixel electrodes 310, which contact the drain electrode 220 through the drain contact hole 240, are formed on the passivation layer 136. Subsequently, though not shown in FIG. 10A, an orientation film of polyimide or photoalignment material is formed on the pixel electrodes 310 and rubbed by a fabric or irradiated by light.

Figure 10B:
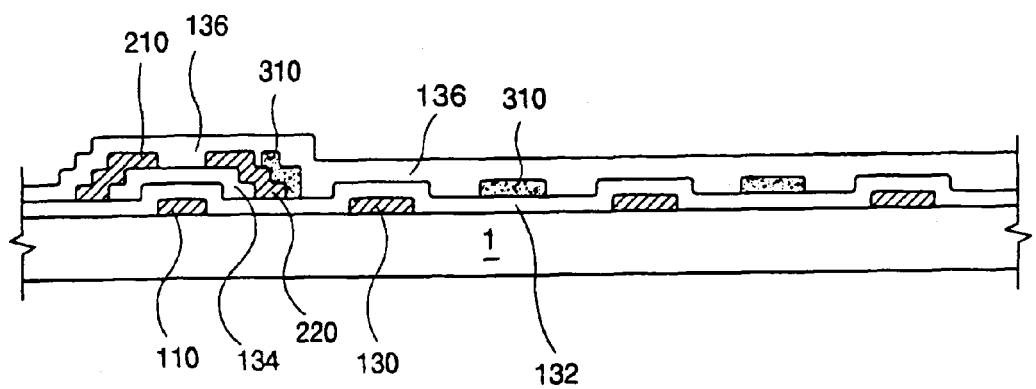

FIG. 10B shows a different fabricating process for the array substrate 1 of FIG. 9. As shown, the pixel electrodes 310 are formed on the gate-insulating layer 132 before the passivation layer 136 is formed. Thereafter, the passivation layer 136 is formed to cover the pixel electrodes 310.

As described above, the IPS-LCD device according to the first preferred embodiment of the present invention employs a transparent conductive material for the common and pixel electrodes 130 and 310 such that light incident from a backlight (not shown) passes through the common and pixel electrodes 130 and 310 with a little or no reflection or absorption.

Therefore, the aperture ratio problem of the conventional IPS-LCD device is reduced or eliminated. For example, compared with the conventional IPS-LCD, the aperture ratio of the IPS-LCD device according to the first preferred embodiment increases by at least 10%.

Now, structures of other portions of the array substrate shown in FIG. 9 are described in detail with reference to FIGS. 11A, 11B, and 12.

Figure 11A:
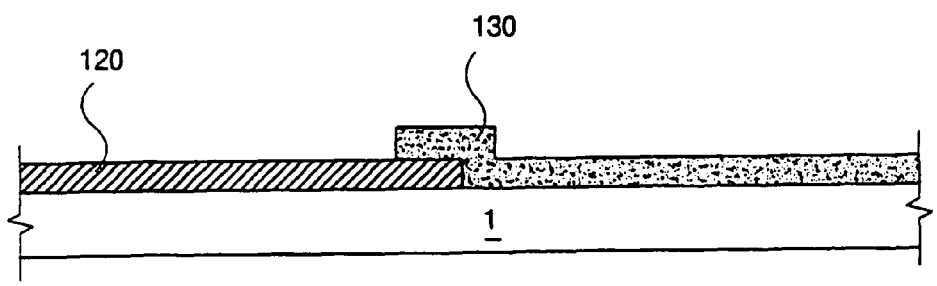
FIGS. 11A and 11B are different cross-sectional views for different embodiments of the present invention taken along a line "XI-XI" of FIG. 9.
Figure 11B:
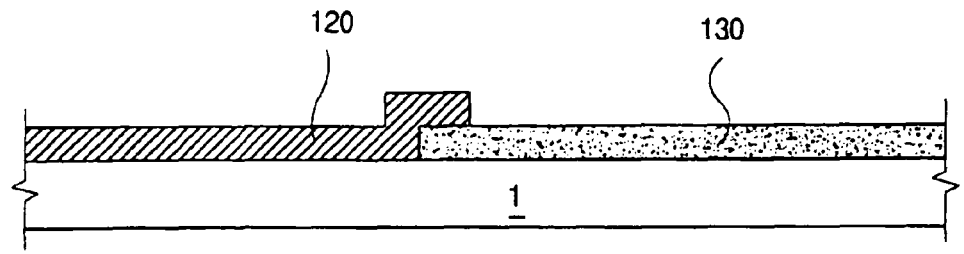

FIGS. 11A and 11B show different structures of the common line 120 and the common electrode 130.

In FIG. 11A, metal for the common line 120 is first formed on the substrate 1, and then the transparent conductive material is formed on the substrate 1 to overlap a portion of the metal for the common line 120. Namely, after the common line 120 is first formed on the substrate 1, the common electrode 130 is later formed on the substrate 1 such that an end of the common electrode 130 overlaps a portion of the common line 120.

On the contrary, as shown in FIG. 11B, if the common electrode 130 is first formed on the substrate 1, the later formed common line 120 overlaps a portion of the common electrode 130. Namely, the transparent conductive material for the common electrode 130 is first formed on the substrate 1, and then the gate line 100 (see FIG. 9) and common lines 100 and 120 are formed on the substrate 1 to overlap a portion of the common electrode 130.

Figure 12:
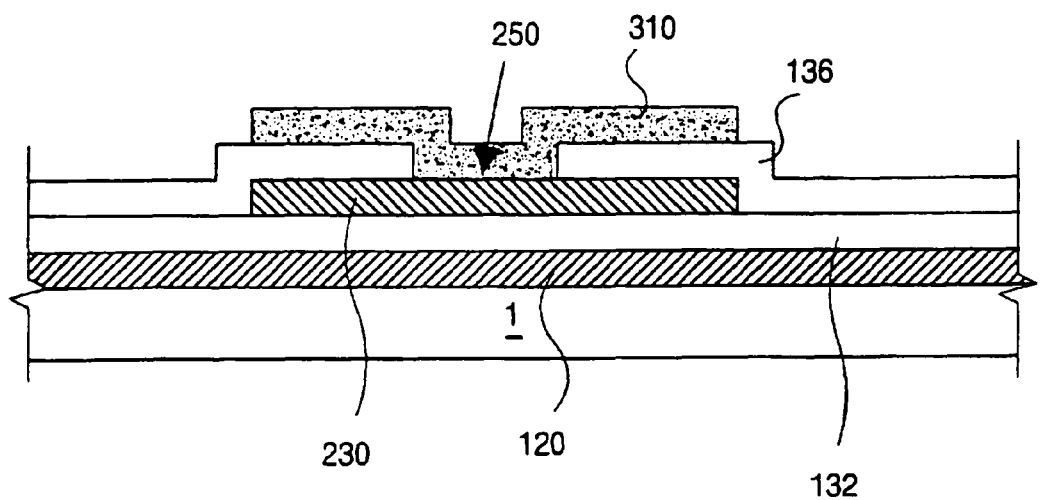
FIG. 12 is a cross-sectional view taken along a line "XII-XII" of FIG. 9.

FIG. 12 shows a storage capacitor including the storage electrode 230 of FIG. 9. As shown, the common line 120 is formed together with the gate line 100 of FIG. 9 on the substrate 1. The gate-insulating layer 132 is then formed to cover the common line 120. The common line 120 is made of the same material as the gate line 100 of FIG. 9. On the gate-insulating layer 132, the storage electrode 230 is formed together with the source and drain electrodes 210 and 220 of FIG. 9, and thus all of them contain the same material.

The passivation layer 136 is formed on the storage electrode 230. The storage contact hole 250 is formed in the passivation layer 136 such that a portion of the storage electrode 230 is exposed through a storage contact hole 250. Thereafter, the pixel electrode 310 is formed on the passivation layer 136 and electrically connected with the storage electrode 230 through the storage contact hole 250.

Figure 13:
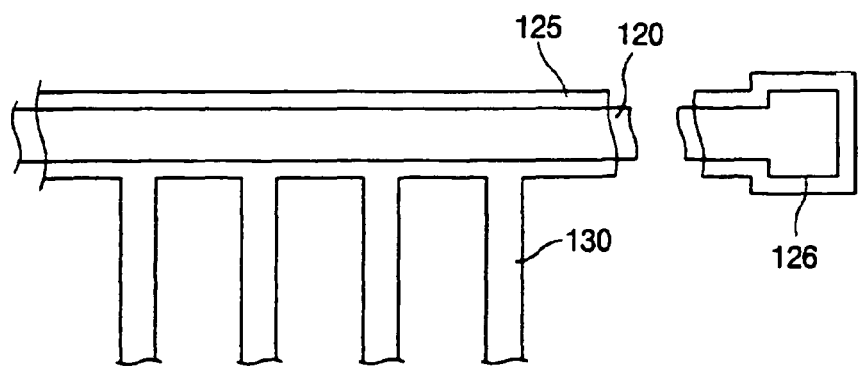
FIG. 13 is a plane view of an auxiliary common line.

When the common line 120 and the common electrodes 130 have the structure shown in FIG. 11A, the common electrodes 130 preferably have the structure of FIG. 13. As shown in FIG. 13, an auxiliary common electrode 125 is formed of the same transparent conductive material as the common electrode 130 to cover the common line 120 and a common pad 126. The common pad 126 is located at one end of the common line 120. The plurality of common electrodes 130 communicate with the auxiliary common electrode 125.

Figure 14:
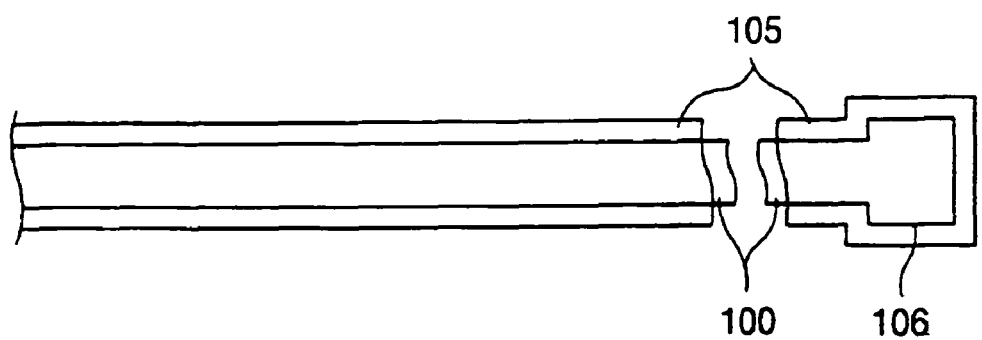
FIG. 14 is a plane view of an auxiliary gate line.

Further, as shown in FIG. 14, an auxiliary gate line 105 of the same transparent conductive material as the common electrodes 130 is preferably employed to cover the gate line 100 and a gate pad 106, which is positioned at one end of the gate line 100. The auxiliary common and gate lines, respectively, protect the common and gate lines from an etching solution in later processes.

In the first preferred embodiment, since the pixel and common electrodes 310 and 130 in the pixel region are formed of the transparent conductive material and the gate, data, and common lines are formed of the metal, the aperture ratio is increased such that the brightness is improved.

Second Preferred Embodiment

The second preferred embodiment employs an opaque metal, instead of the ITO, for a pixel electrode. Further, in the second preferred embodiment, a black matrix is formed together with the pixel electrode.

Figure 15:
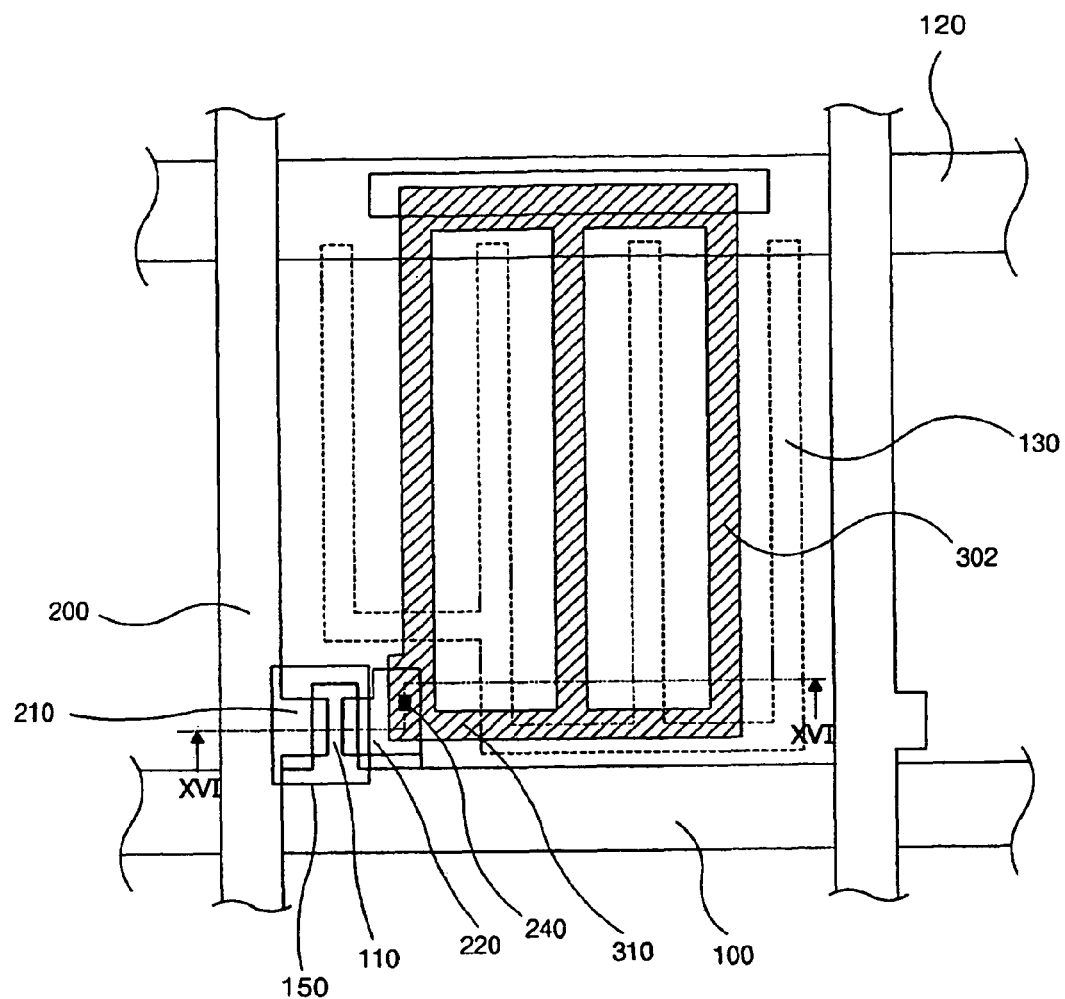
FIG. 15 is a plane view illustrating an array substrate of an IPS-LCD device according to a second preferred embodiment of the present invention.
Figure 16:
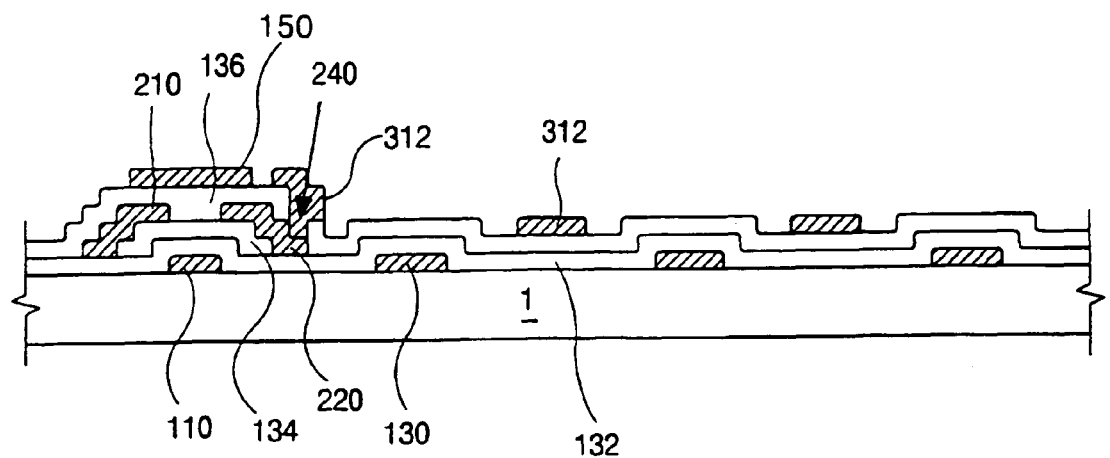
FIG. 16 is a cross-sectional view taken along a line "XVI-XVI" of FIG. 15.

As shown in FIGS. 15 and 16, the pixel electrodes 312 of the opaque metal are formed instead of the transparent pixel electrodes 310 of FIG. 9. The black matrix 150 of opaque material is formed on the passivation layer 136 to cover the active layer 134. To form the pixel electrode 312 and the black matrix 150, the opaque metal layer is deposited on the passivation layer 136 and patterned in the same process. The opaque metal layer is preferably chromium (Cr), which has a low light-reflectivity.

An IPS-LCD device according to the second preferred embodiment of the present invention preferably employs a normally black (NB) mode LC that displays dark when no electric field is applied to the LC.

Compared with the aperture ratio of a conventional IPS-LCD device employing a black matrix that is wider than the gate or data line, the aperture ratio of an IPS-LCD device employing the array substrate according to the second preferred embodiment of the present invention increases by more than 10%.

As described above, the preferred embodiment of the present invention has advantages of higher aperture ratio than the conventional one.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. An in-plane switching liquid crystal display device comprising:
    a gate line formed of a first material on a first substrate;
    a data line on the first substrate, the data line being perpendicular to the gate line;
    a common line on the first substrate, the common line being parallel with the gate line and being formed of a metal;
    a plurality of pixel electrodes and a plurality of common electrodes having finger portions and arranged in parallel on the first substrate, the common electrodes being a transparent conductive second material different from the first material, and the pixel electrodes being one of a transparent and opaque material;
    a first connecting line parallel to the gate line, wherein the plurality of pixel electrodes are perpendicular to the first connecting line, first ends of the pixel electrodes are connected to the first connecting line and second ends of the pixel electrodes are connected to a second connecting line;
    an auxiliary common line connected with the plurality of common electrodes, the auxiliary common line covering the common line such that the auxiliary common line contacts side and top surfaces of the common line;
    a storage electrode over the common line, wherein the storage electrode contacts the second connecting line via a storage contact hole; and
    a liquid crystal layer between the first and second substrates, wherein the common electrodes alternate with and are parallel to the pixel electrodes,
    wherein the common electrodes are formed on a same layer of the first substrate as the gate line.

2. The device of claim 1, wherein the transparent conductive material includes indium tin oxide (ITO).

3. The device of claim 1, wherein the transparent conductive material includes indium zinc oxide (IZO).

4. The device of claim 1, wherein the common line includes a material selected from a group consisting of chromium (Cr), aluminum (Al), aluminum alloy (Al alloy), molybdenum (Mo), Tantalum (Ta), tungsten (W), antimony (Sb), and an alloy thereof.

5. The device of claim 1, further comprising a first alignment layer on the first substrate.

6. The device of claim 5, wherein the first alignment layer is selected from a group consisting of polymide and photo-alignment material.

7. The device of claim 1, further comprising a thin film transistor at an intersection of the gate and data lines.

8. The device of claim 1, further comprising a gate-insulating layer over the gate line.

9. The device of claim 8, further comprising a passivation layer over the gate-insulating layer.

10. The device of claim 9, wherein the pixel electrodes are on the passivation layer.

11. The device of claim 9, further comprising a black matrix on the passivation layer.

12. The device of claim 11, wherein the black matrix includes the same material as the pixel electrodes.

13. An in-plane switching Liquid Crystal Display (LCD) device, comprising:
a first substrate and a second substrate;
a gate line formed of a first material on the first substrate;
a metal common line on the first substrate, the common line parallel to the gate line;
a data line on the first substrate, the data line being perpendicular to the gate line;
a plurality of common electrodes on the first substrate, the plurality of common electrodes having finger portions;
an auxiliary common line connected with the plurality of common electrodes, the auxiliary common line covering the common line such that the auxiliary common line contacts side and top surfaces of the common line;
a thin film transistor having a gate electrode, a source electrode and a drain electrode formed on the first substrate;
a liquid crystal layer interposed between the first and second substrates;
a plurality of pixel electrodes contacting the drain electrode of the thin film transistor;
a first connecting line contacting the drain electrode and parallel to the gate line, wherein the plurality of pixel electrodes are perpendicular to the first connecting line, first ends of the pixel electrodes are connected to the first connecting line and second ends of the pixel electrodes are connected to a second connecting line; and
a storage electrode over the common line, wherein the storage electrode contacts the second connecting line,
wherein the common electrodes alternate with and are parallel to the pixel electrodes, and
wherein the common electrodes are a transparent conductive second material different from the first material, the pixel electrodes are one of a transparent and opaque material, and the common electrodes are formed on a same layer of the first substrate as the gate line.

14. The LCD device of claim 13, wherein a portion of the common line overlies a portion of the common electrode.

15. The LCD device of claim 13, wherein the storage electrode contacts the pixel electrodes through a storage contact hole.

16. The LCD device of claim 13, wherein the storage electrode is between the pixel electrodes and the first substrate.

17. The LCD device of claim 13, further comprising a common pad at an end of the common line.

18. The LCD device of claim 13, further comprising an auxiliary gate line and a gate pad covering the gate line and the gate pad.

19. The LCD device of claim 18, wherein the auxiliary gate line is formed of the same transparent conductive material as the common electrodes.

20. The device of claim 18, wherein the auxiliary gate line includes indium tin oxide (ITO).

21. The device of claim 18, wherein the auxiliary gate line includes indium zinc oxide (IZO).

22. The LCD device of claim 13, further comprising a black matrix on the second substrate.

23. The LCD device of claim 13, wherein the transparent conductive material includes indium tin oxide (ITO).

24. The LCD device of claim 13, wherein the transparent conductive material includes indium zinc oxide (IZO).

* * * * *